Figure 1:
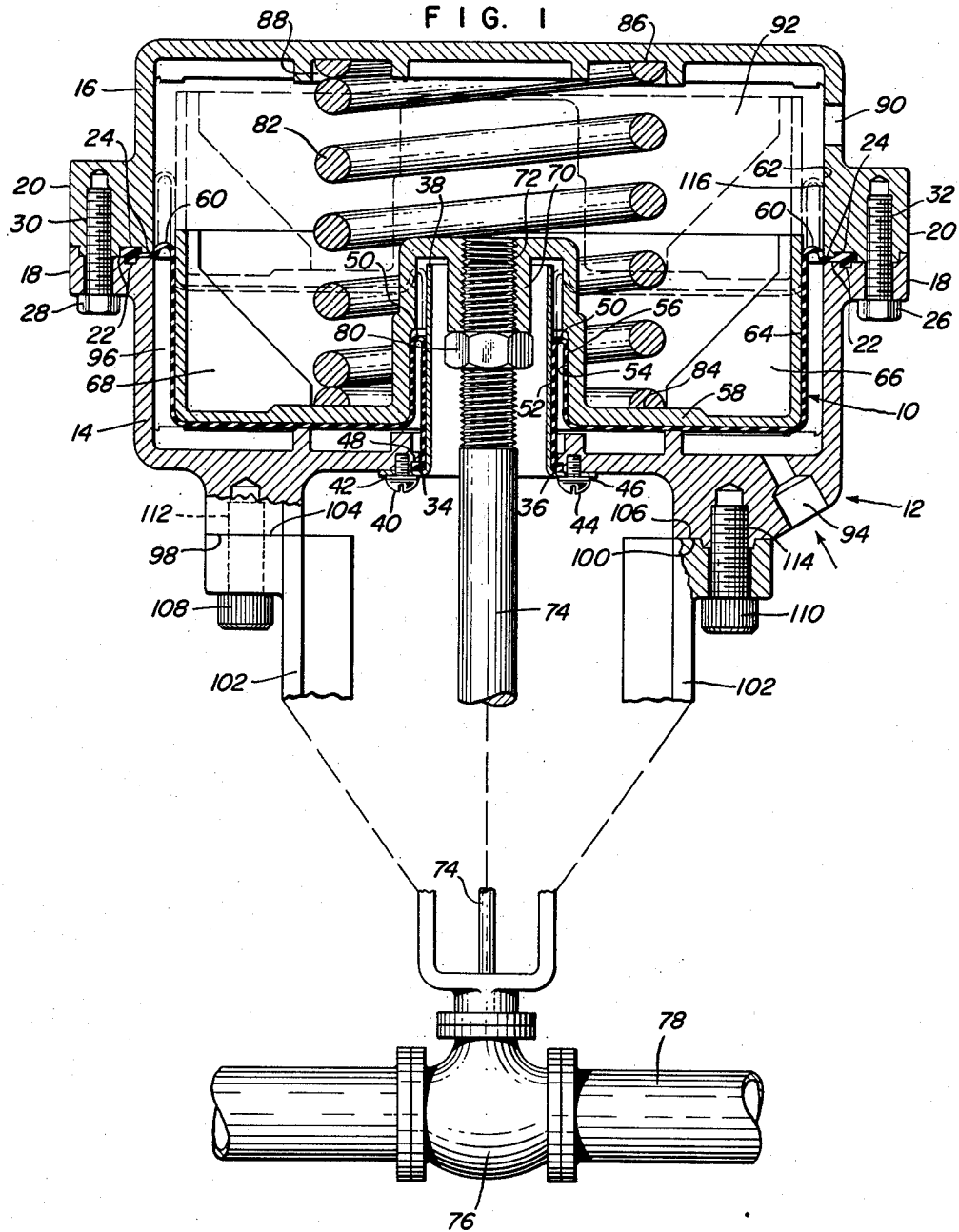

April 27, 1965 R. SCHMITZ 3,180,235
CONTROLLING APPARATUS

Filed Feb. 25, 1963 2 Sheets-Sheet 1

INVENTOR.
ROBERT SCHMITZ
BY *Arthur H. Swanson*
ATTORNEY.

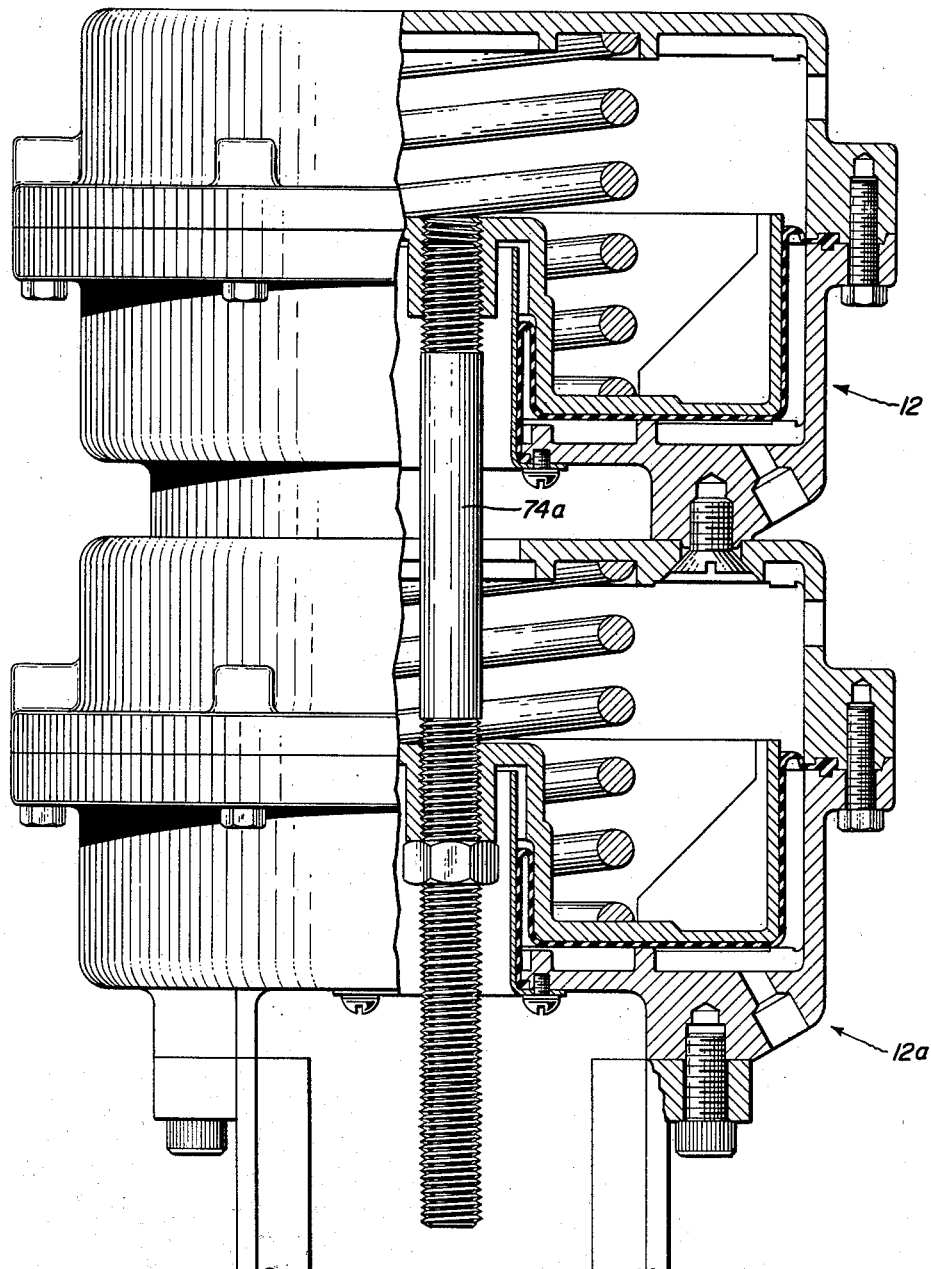

United States Patent Office 3,180,235
Patented Apr. 27, 1965

3,180,235
CONTROLLING APPARATUS
Robert Schmitz, Hatboro, Pa., assignor to
Honeywell Inc., a corporation of Delaware
Filed Feb. 25, 1963, Ser. No. 260,542
8 Claims. (Cl. 92—95)

An object of the present invention is to disclose a unitary, moving diaphragm and seal unit for use in a control apparatus to convert fluid pressure changes acting on a side surface of the diaphragm into a mechanical motion.

More specifically, the present invention discloses a unitary diaphragm and seal unit for use in a stem actuating unit of a valve.

It is another object of the invention to provide a modified form of actuator in which a unitary diaphragm and seal unit of the aforementioned type is employed in each one of a series of stacked valve stem actuating units.

It is another object of the present invention to disclose a unitary diaphragm construction which has a flat, central portion of a ring-shaped configuration and a convolution extending along two annular parts of the diaphragm that are respectively located adjacent an inner, circumferential portion and an outer, circumferential portion.

It is another object of the present invention to provide a diaphragm plate that is formed with a flat surface against which the flat surface of the aforementioned diaphragm is retained as well as having an annular surface along which the convolutions in the inner and outer, circumferential portions thereof can be brought into rolling engagement as the aforementioned valve actuator is moved between different valve actuating positions.

It is a further object of the invention to provide a diaphragm which can be moved through relatively large displacement by allowing a convolution on its inner, annular surface to be rolled off of an annular surface of a diaphragm support plate, in the form of a piston, while its outer, annular surface is simultaneously rolled onto another annular surface of the piston and vice-versa.

It is another object of the present invention to provide a readily-removable, rolling fluid seal between a stationary and a movable part of an actuator.

Prior to the present invention, it has been the custom to employ a fluid-tight seal between a movable part of an actuator and the stem of a valve that is moved by the actuator. Experience has shown that stem connected seals have not been satisfactory because they introduce stem friction as the valve is moved between different open and closed positions.

It is an object of the present invention to provide a rigid, cylindrical sleeve spaced away from the valve stem for attaching an inner end of the diaphragm in sealed relation to a stationary part of the actuator to eliminate the aforementioned stem friction.

A better understanding of the present invention may be had from the following detailed description when read in connection with the accompanying drawings in which:

FIG. 1 shows a cross-section of the unitary, moving diaphragm and seal unit mounted for use in a single valve actuator, and FIG. 2 is a modified form of the invention showing how the type of diaphragm and seal unit of FIG. 1 can be used to advantage in a series of stacked valve stem actuating units.

The diaphragm and seal unit 10 is shown in FIG. 1 of the drawing mounted for use in a valve actuator 12. This actuator has a lower casing 14 and an upper casing 16 whose respective, annular, circumferential flanges 18, 20 are shown retained in a compressed relation with the opposite, outer, annular, circumferential surface portions 22, 24 of the diaphragm and seal unit 10 to form a fluid-tight joint therebetween. A suitable number of tap bolts 26, 28 are shown in threaded engagement at 30, 32 to retain the flanges 18, 20 in the aforementioned compressed condition.

An inner, annular, circumferential portion 34 of the diaphragm and seal unit 10 and the lower flanged ends 36 of a cylindrical sleeve 38 are fixedly retained by a suitable number of threaded screw and washer connections 40, 42; 44, 46 to an annular, inner wall portion 48 of the lower case 14.

When the diaphragm and seal unit 10 is in the solid-line position, shown in the drawing, the inner, annular portion of this unit will form a first convolution 50. When the unit 10 is in this solid-line position, the left, outer surface 52 of this convolution 50 will be in physical contact with the outer wall of the sleeve 38, and its right, outer, vertical surface 54 will be in physical contact with the inner wall of the annular, circumferential surface 56 of a hollow, dished-out piston 58.

When the diaphragm and seal unit 10 is in its solid-line position, it can also be seen that an outer, annular portion of this unit will form a second convolution 60. The right, outer surface of this second convolution 60 will be in physical contact with a small length of the inner wall surface 62, and the left, inner surface of the convolution 60 will be in physical contact with substantially the entire outer surface 64 of the piston 58.

The piston 58 is also shown as having a suitable number of ribs 66, 68 and a hollow, centrally-located hub portion 70. The inner wall surface of the hub portion 70 is shown in threaded engagement at 72 to the upper portion of the stem 74 of the valve 76 that, in turn, is used to control the flow of a fluid passing through the flow conduit 78.

A jam nut 80 is shown in surface to surface engagement with the lower end of the hub portion 70 to retain it and the hub and the remaining integral parts of the piston in fixed, movable relation with the valve stem 74.

A compression spring 82 is shown in an expanded position and as having its lowermost end in compressed engagement with an inner, horizontal, surface portion 84 of the piston 58 and an upper end in compressed engagement with surface 86 of the cylindrical, cup-shaped portion 88 of the upper casing 16.

A passageway 90 is shown in the drawing for exhausting the upper chamber 92 formed by the upper casing 16 and the diaphragm and seal unit 10.

Another passageway 94 is shown in the drawing for transmitting a regulated supply pressure from a supply source, not shown, into and out of the chamber 96 formed by the lower casing 14 and the diaphragm and seal unit 10. The spring 82 and the pressure of the supply fluid being applied through the passageway 94 to the chamber 96 formulates a compressing means for moving the diaphragm from one position to another.

The top flanged surfaces 98, 100 of a conventional yoke 102 for guiding stem 74 are shown in engagement with the surfaces 104, 106 of the lower casing 14.

Connecting tap bolts 108, 110 are shown threadedly joined at 112, 114 with the yoke 102.

When the fluid under pressure is applied by way of a passageway 94 into the bottom actuator chamber 96, the diaphragm and seal unit 10 of the piston 58 will be moved in an upward, vertical direction against the force of the compressive spring 82. The distance which the unit 10 and piston 58 will be moved in an upward direction will depend on the magnitude of the regulated fluid pressure that is applied to the chamber 96. When the fluid pressure being applied to the chamber 96 is at a minimum value, the unit 10 and piston 58 will be in the solid-line position; and when the applied fluid pressure is at a maximum regulated value, the unit 10 and the piston 58 will be in the dash-line position.

When the diaphragm and seal unit 10 is in the dotted-line position, shown in the drawing, the left outer surface 52 of the first convolution 50 will be in physical contact with the larger surface of the outer wall of the sleeve 38 than it was contacting when it was in its solid-line position.

When the diaphragm and seal unit 10 is in the dotted-line position, the right, outer surface 116 of the second convolution 60 will be in physical contact with the outer surface 62 of the inner wall of the upper actuator casing 16.

It can also be seen that, as the pressure in the lower chamber 96 of the actuator is increased and the diaphragm 10 and piston 58 are moved from their solid-line position toward their dotted-line position, the top round portion of the first convolution 50 will be formed by successive, integral, flexible portions of the diaphragm and seal unit 10 that are rolled off of the annular, circumferential surface 56 of the piston 58.

It can further be seen that, as the aforementioned action takes place, the top, round portion of the second convolution 60 will be formed by successive, integral, flexible portions of the diaphragm and seal unit 10 that are simultaneously rolled off of the outer, cylindrical surface 64 of the piston 58.

The actuator 12, shown in FIG. 1, can have an additional actuator 12a added to it, as shown in FIG. 2, to double the force that is supplied to a valve stem 74a that extends between these actuator units 12 and 12a.

It is also readily conceivable under the present invention to employ an apparatus that discloses three or more of these valve actuator units in series in lieu of the single and double valve actuator units shown in FIGS. 1 and 2 to thereby additionally increase the force such an apparatus can apply to a valve stem.

From the aforementioned description, it can be seen that a unitary, substantially frictionless diaphragm and seal unit 10 has been disclosed herein for use in a fluid actuator which is provided with a convolution in its inner and outer annular surfaces and a cylindrical sleeve adjacent the inner surface to enable these surfaces to be readily rolled on and off of a piston as the piston is moved between two different positions.

What is claimed is:

1. A valve actuator, comprising a plurality of casings mounted in series with one another, a flexible diaphragm separating each of the casings into a separate first and second chamber and forming a common wall between the chambers, a diaphragm plate of a piston shape configuration within each casing having an inner and outer annular spaced-apart side wall portion, a flat side surface of the diaphragm in each of the chambers being in physical engagement for movement with a flat annular base portion of its associated diaphragm plate that extends between its inner and outer annular side wall portion thereof, each diaphragm being provided with two convolutions, one convolution having a side wall portion thereof extending along and being in physical contact with the inner annular side wall portion of its associated diaphragm plate and the other convolution extending along and being in physical contact with an outer annular side wall portion of said last-mentioned diaphragm plate, and a compressing means operably connected to simultaneously move the diaphragms from one position to another and the successive side wall portions of each of their associated convolutions along and into physical rolling engagement with inner and outer annular side wall portions of their associated pistons.

2. A valve actuator, comprising a casing, a flexible diaphragm separating the casing into separate first and second chambers, a diaphragm plate of an annular trough-shaped configuration having circumferentially spaced-apart inner and outer annular side wall portions, a flat surface of the diaphragm being in physical engagement for movement with a flat annular base portion of the diaphragm plate which extends between the inner and outer annular side wall portion, the diaphragm being further provided with two annular spaced-apart convolutions, one of said convolutions having a side wall portion thereof extending substantially entirely around and being in physical contact with the inner annular wall portion of the diaphragm plate, another convolution having a side wall portion thereof extending substantially entirely around and being in physical contact with the outer annular side wall portion of the diaphragm plate, and a compressing means to simultaneously move the flat surface of the diaphragm and its associated diaphragm plate from one position to another while successive inner and outer diaphragm side wall portions of the annular spaced convolutions are rolled along in physical engagement with their associated inner and outer annular side wall portions of the trough-shaped diaphragm plate.

3. The valve actuator, as defined in claim 2, wherein the ends of the side wall portions of the spaced-apart convolutions are operably connected to simultaneously roll off their associated circumferentially spaced-apart inner and outer side wall portions of the trough-shaped diaphragm plate when the compressing means is operably connected to move the diaphragm and the diaphragm plate in one direction and to roll onto their associated circumferentially spaced-apart inner and outer annular wall portions of the trough-shaped diaphragm plate when the compressing means is operably connected to move the diaphragm and the diaphragm plate in an opposite direction.

4. The valve actuator, as defined in claim 2, wherein a sleeve is positioned adjacent the inner annular wall portion of the trough-shaped diaphragm plate to provide a surface against which the other side wall portion of the inner convolution can be engaged and disengaged in a roll-on and roll-off manner as the other side wall of the last-mentioned convolution is respectively rolled off of and rolled onto the inner annular side wall portion of the trough, and wherein a flared end of the sleeve and a connecting means are employed to retain an annular inner flat portion of the diaphragm in compressed fluid-tight removable engagement with a wall forming one of the chambers.

5. The valve actuator, as defined in claim 2, wherein a flared end of a sleeve and connecting means are employed to retain an annular inner flat portion of the diaphragm in compressed fluid-tight removable engagement with a wall forming one of the chambers, and wherein the convolution that has a side wall portion in peripheral contact with the inner annular wall portion of the trough is provided with another side wall portion that is in physical rolling contact with the outer circumferential surface of the sleeve.

6. The valve actuator, as defined in claim 2, wherein a flared end of a sleeve and connecting means are employed to retain an annular inner flat portion of the diaphragm in compressed fluid-tight removable engagement with a wall forming one of the chambers, and wherein the convolution that has a side wall portion in peripheral contact with the inner annular wall portion of the trough is provided with another side wall portion that is in physical rolling contact with the outer circumferential surface of the sleeve, the last-mentioned side wall portion of the convolution being operably connected to simultaneously roll off the circumferential surface of the sleeve while the side wall portions that are respectively in contact with the outer and inner annular wall portions of the trough are rolled onto the trough when the compressing means is operably connected to move the diaphragm in one direction, and said wall portion in contact with the sleeve being of a construction to enable the side wall of the inner convolution to be rolled onto the circumferential surface of the sleeve while the remaining side wall portion of the inner convolution and the outer side wall of the outer convolution is rolled off of the respective inner and outer ring-shaped wall portions of the trough when the compressing means is operably connected to move the diaphragm in an opposite direction.

7. A valve actuator comprising, a diaphragm, an annular, flat, central ring portion of the diaphragm being positioned in physical contact with a movable diaphragm plate member of an annular trough-shaped configuration that is adapted to be fixedly connected for movement with a stem of a valve member, a stationary sleeve member positioned between the valve stem and the inner side wall of the trough, an annular convolution of an inverted U-shaped configuration forming an inner ring portion of the diaphragm and having a first side wall thereof adapted to be moved along and in rolling contact with the outer peripheral wall of the stationary cylindrical sleeve member when the valve stem and diaphragm plate connected therewith is moved from one position to another, said inner ring portion of the diaphragm having a second side wall thereof adapted to be simultaneously moved with the first side wall along and in rolling contact with an inner annular side wall of the movable trough-shaped diaphragm plate member during the valve stem movement, and a second annular convolution of an inverted U-shaped configuration forming an outer ring portion of the diaphragm and having opposite side wall portions adapted to be moved along and in rolling contact with an outer wall of the movable trough-shaped diaphragm plate member and an inner surface of a casing wall surrounding the diaphragm when the valve stem and diaphragm plate connected therewith is moved from one position to another.

8. A diaphragm of a ring-shaped configuration for use in each of a plurality of valve actuators connected in series, comprising an annular, flat, central ring portion adapted to be retained in physical contact with the sides and base wall surfaces of a movable annular member that is fixedly connected to a valve stem for movement therewith, a first annular convolution on an inner ring portion of the diaphragm having a first side wall adapted to be moved along and in rolling contact with the outer peripheral wall of a stationary cylindrical member that is operably positioned in spaced relation with the valve stem when the valve stem and the ring portion is moved from one position to another, a second side wall of the annular convolution adapted to be moved along and in rolling contact with an inner annular wall of the movable member when the valve stem and the ring portion is moved between said last-mentioned positions, and a second annular convolution forming an outer ring portion of the diaphragm and having opposite side wall portions thereof respectively adapted to be moved simultaneously with the first side wall of the first convolution along and in rolling contact with an outer wall of the movable annular member and an inner surface of a casing wall surrounding the diaphragm when the valve stem and the ring portion is moved from one of their said positions to another.

References Cited by the Examiner
UNITED STATES PATENTS 2,716,426   8/55   Price _____ 92—101
2,983,256   5/61   Seeloff _____ 92—151
3,082,792   3/63   Jenkins _____ 92—101

KARL J. ALBRECHT, *Acting Primary Examiner.*

RICHARD WILKINSON, *Examiner.*